(12) United States Patent
Hull et al.

(10) Patent No.: US 7,387,288 B2
(45) Date of Patent: Jun. 17, 2008

(54) FITTING FOR ENT TUBING

(75) Inventors: Eric G. Hull, Madison, OH (US); Charles H. Riedy, Lakewood, OH (US); Gregory D. Turcovsky, Mentor, OH (US); Robert M. Gudin, Willoughby, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 480 days.

(21) Appl. No.: 10/729,739

(22) Filed: Dec. 5, 2003

(65) Prior Publication Data

US 2005/0121902 A1   Jun. 9, 2005

(51) Int. Cl.
*E04G 15/00* (2006.01)
*E04G 15/06* (2006.01)

(52) U.S. Cl. ........................................ 249/91; 52/220.8

(58) Field of Classification Search ................ 403/165, 403/300, 308, 329, 361; 138/96 R, 96 T; 285/903, 921; 249/83, 91; 52/699, 701, 52/704, 220.8
See application file for complete search history.

(56) References Cited

U.S. PATENT DOCUMENTS

| | | | | |
|---|---|---|---|---|
| 685,694 | A * | 10/1901 | Schamp | 285/64 |
| 3,313,559 | A * | 4/1967 | Kifer | 285/43 |
| 3,800,486 | A * | 4/1974 | Harvey | 52/220.8 |
| 4,686,738 | A * | 8/1987 | Bladh | 174/152 G |
| 4,817,348 | A * | 4/1989 | Wydra | 52/220.8 |
| 4,864,782 | A * | 9/1989 | Hasty | 52/60 |
| 5,112,086 | A * | 5/1992 | Gruber et al. | 285/86 |
| 5,356,181 | A * | 10/1994 | Shirogane et al. | 285/86 |
| 5,456,050 | A * | 10/1995 | Ward | 52/220.8 |
| 5,560,163 | A * | 10/1996 | Carlton | 52/220.8 |
| 5,787,672 | A * | 8/1998 | Giannuzzi et al. | 52/699 |
| 6,061,990 | A * | 5/2000 | McMahon | 52/220.8 |
| 6,176,052 | B1 * | 1/2001 | Takahashi | 52/232 |
| 6,194,659 | B1 * | 2/2001 | Cornu | 174/659 |
| 6,199,918 | B1 * | 3/2001 | Gerich | 285/308 |
| 6,278,061 | B1 * | 8/2001 | Daoud | 174/659 |
| 6,426,463 | B2 * | 7/2002 | Munzenberger et al. | 174/77 R |
| 6,634,676 | B1 | 10/2003 | Lampson et al. | 285/123.15 |
| 6,988,747 | B2 * | 1/2006 | Allen et al. | 285/322 |
| 2003/0155767 | A1 * | 8/2003 | Hardie et al. | 285/319 |

FOREIGN PATENT DOCUMENTS

JP         8338130        12/1996

* cited by examiner

*Primary Examiner*—Robert J. Sandy
*Assistant Examiner*—Ruth C Rodriguez
(74) *Attorney, Agent, or Firm*—Jones Day (57) ABSTRACT

A fitting for attaching ENT tubing to a concrete form has an inverted cup-like configuration with a bottom opening and an internal cavity within a fitting wall. A flange extends outwardly from the fitting wall around the bottom opening and has fastener-receiving holes for attaching the fitting to a plane surface of a concrete form. A socket extends through the fitting wall into the cavity for receiving an end portion of an ENT tube. The socket has a plurality of circumferentially-spaced resilient fingers that are inclined inwardly toward the socket axis for gripping an ENT tube. A pair of opposite fingers have teeth that are receivable in an annular groove in an end portion of a corrugated ENT tube. The teeth have rounded ends to facilitate ratcheting movement of the ENT tube end portion both into and out of the socket.

6 Claims, 11 Drawing Sheets

FITTING FOR ENT TUBING

BACKGROUND

This application relates to the art of electrical fittings and, more particularly, to fittings for use with ENT tubing. The application is particularly concerned with fittings for attaching ENT tubing to concrete forms and will be described with specific reference thereto. However, it will be appreciated that the application has broader aspects and that features of the fitting can be used for other purposes in other environments.

SUMMARY

A fitting of the type described has a socket with a plurality of circumferentially-spaced resilient fingers that are inclined inwardly toward the socket axis for frictionally gripping the external surface of an end portion of an ENT tube. At least one opposite pair of fingers has inwardly extending teeth thereon for reception in an annular groove in an end portion of an ENT tube.

In accordance with one arrangement, the teeth are configured to facilitate both insertion and withdrawal of an ENT tube with respect to the socket.

In accordance with another aspect of the application, only two of the plurality of the resilient fingers have teeth thereon so that the fitting is easily removable from an end portion of an ENT tube after the concrete has cured and the form has been removed.

In accordance in another aspect of the application, the fitting has an internal cavity with a rib that can be gripped within pliers jaws for removing the fitting from a cured concrete mass.

The fitting may have a frustoconical peripheral wall that terminates in a flat wall, and the socket extends into a fitting cavity through the end wall.

In another arrangement, the fitting wall is configured so that the socket longitudinal axis extends at an acute angle to the plane of a surface to which the fitting is attached. The angle may be around 45 degrees, and the fitting is configured so that the socket longitudinal axis intersects a bottom opening on the fitting.

It is a principal object of the present invention to provide an improved fitting for attaching ENT tubing to concrete forms.

It is another object of the invention to provide an improved socket for gripping ENT tubing while permitting separation of the fitting from the tube.

It is an additional object to provide a fitting that is easy to remove from a cured concrete mass.

DESCRIPTION OF REPRESENTATIVE EMBODIMENTS

Referring now to the drawing, where in the showings are for purposes of illustrating representative embodiments of the fitting only and not for purposes of limited same, FIGS. 1-8 show a fitting A molded in one-piece of plastic material and having a generally inverted cup-like configuration. Fitting A is particularly suited for use in attaching electrical non-metallic tubing, commonly known as ENT tubing, to a concrete form.

Fitting A has a generally frustoconical peripheral wall 12 that terminates at a flat end wall 14. Peripheral wall 12 gradually tapers inwardly toward end wall 14 from a circular bottom opening 16. A peripheral flange 18 extends outwardly around circular opening 16 and has a plane outer flange surface 20 that is positionable against a plane surface of a concrete form. A plurality of circumferentially-spaced fastener receiving holes 24 are provided in flange 18 for attaching the fitting to a plane surface of a concrete form.

The fitting is hollow so that peripheral wall 12 and end wall 14 define an internal cavity within the fitting. A socket 30 extends into the internal cavity through end wall 14. A smoothly curved or rounded circular entrance portion 32 extends from the plane outer surface of end wall 14 into socket 30. Curved entrance portion 32 intersects a generally cylindrical entrance portion 34.

A plurality of circumferentially-spaced resilient fingers extend from generally cylindrical entrance portion 34. The fitting shown in FIGS. 1-8 is for use with one-half inch ENT tubing and there are six equidistantly-spaced fingers 40, 41, 42, 43, 44 and 45. Fittings for use with three-quarter inch ENT tubing or one inch ENT tubing usually will have eight equidistantly-spaced fingers. However, it will be appreciated that a larger or smaller number of fingers may be provided without departing from the improvements of the present application. The fingers are of generally the same size and shape.

The inner surfaces of fingers 40-45 are curved so that they lie on the surface of a common cone. Resilient fingers 40-45 are inclined inwardly from generally cylindrical portion 34 toward longitudinal axis 50 of socket 30. The inward inclination of the fingers from generally cylindrical portion 34 to the terminal ends of the fingers may be at an included angle with axis 50 of around five degrees.

Figure 1:
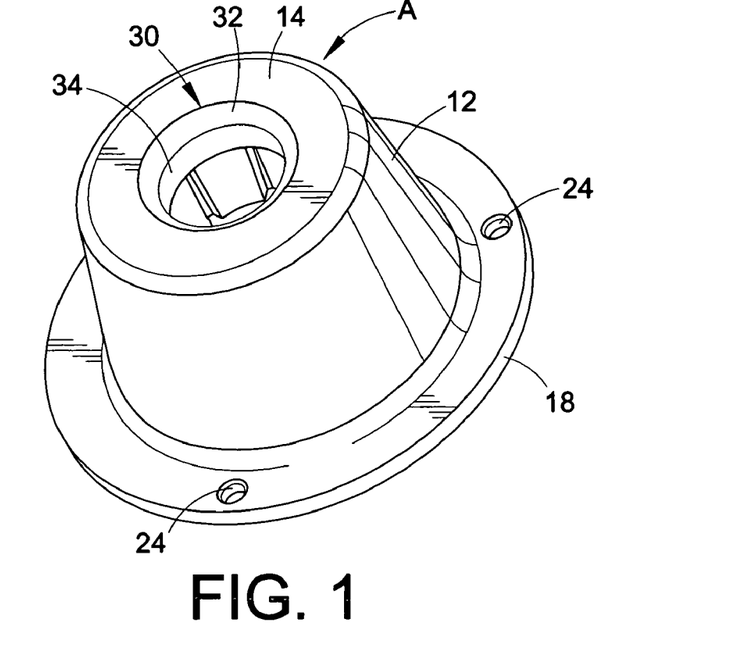
FIG. 1 is a perspective illustration of a fitting in accordance with the present application.
Figure 2:
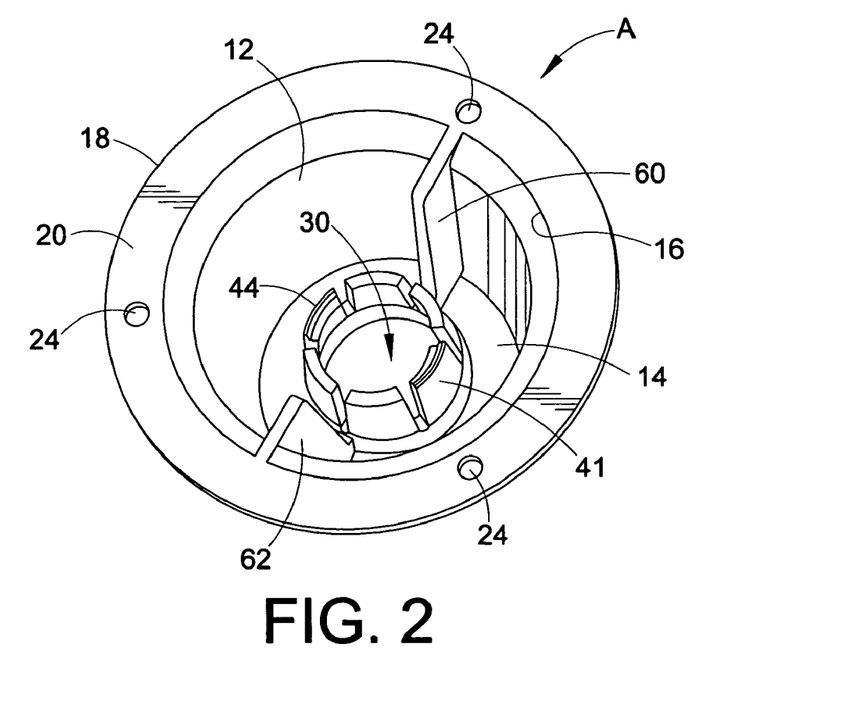
FIG. 2 is another perspective illustration looking at the bottom thereof.
Figure 3:
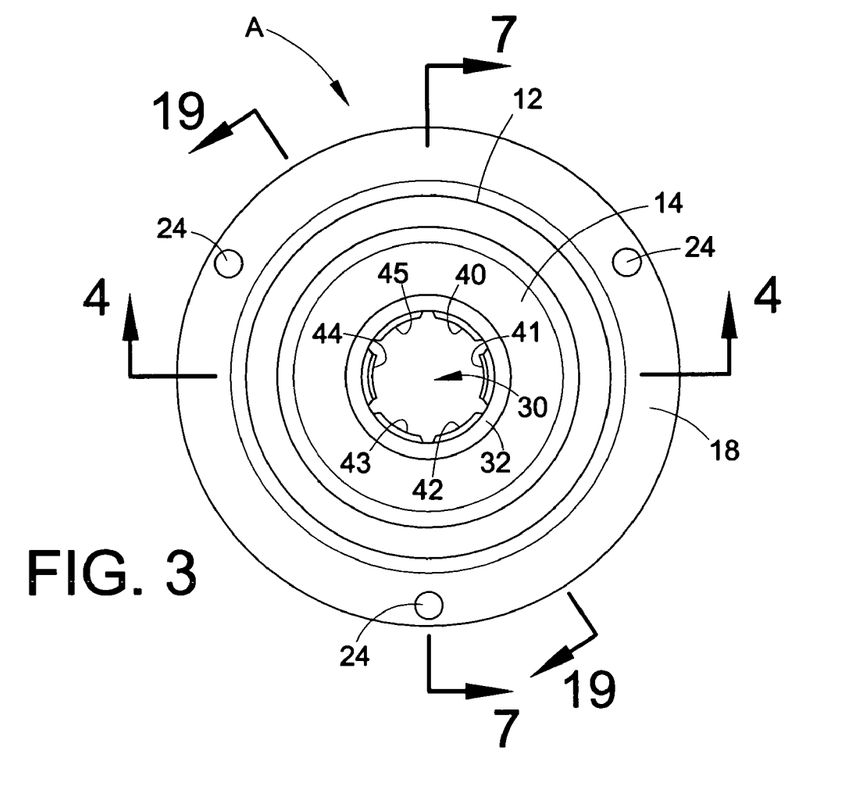
FIG. 3 is a top plan view thereof.
Figure 4:
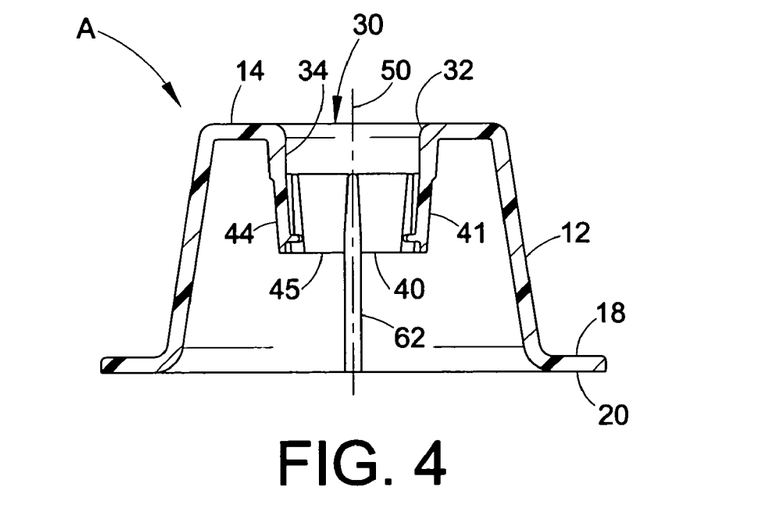
FIG. 4 is a cross-sectional elevation view taken generally on line 4-4 of FIG. 3.
Figure 5:
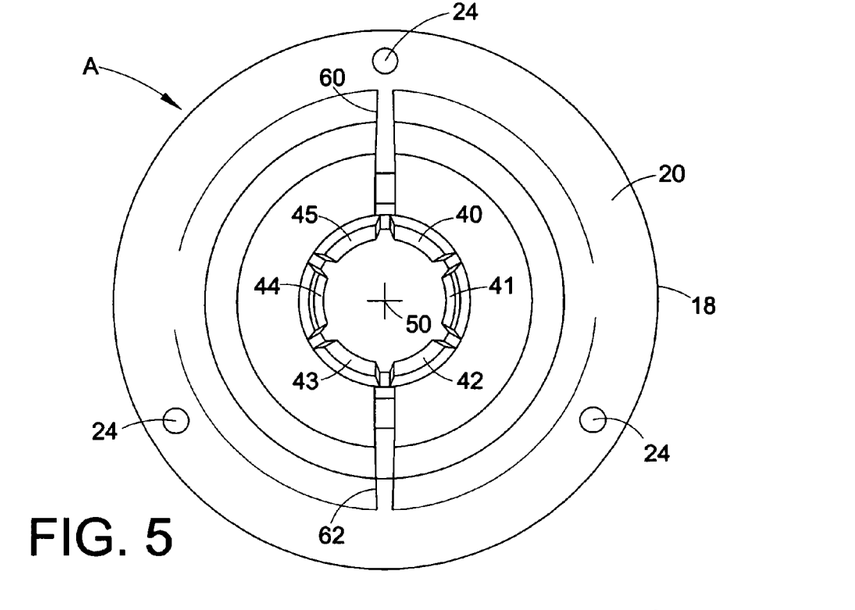
FIG. 5 is a bottom view thereof.
Figure 6:
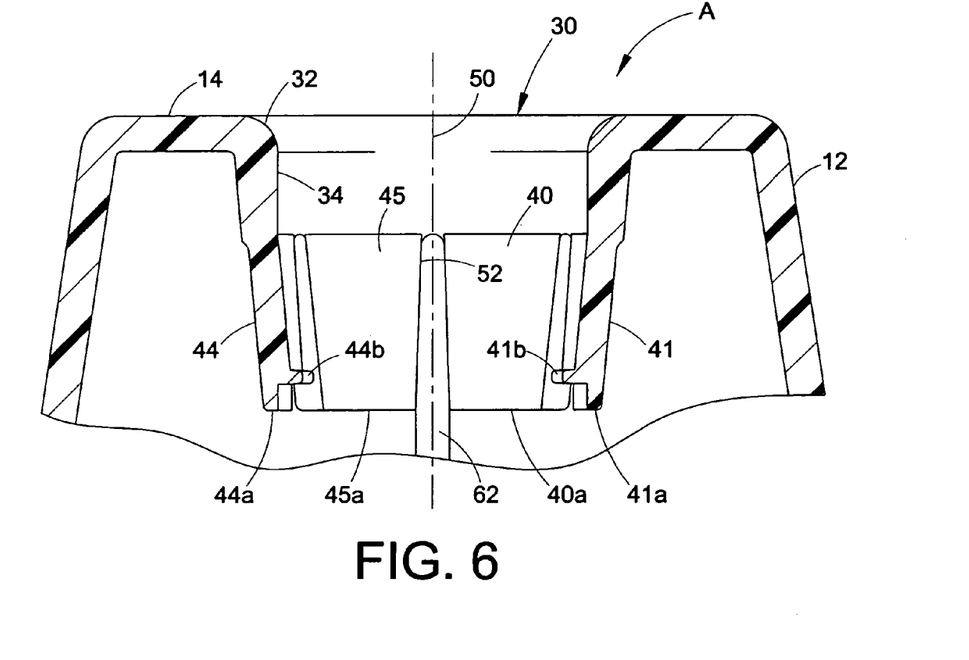
FIG. 6 is an enlarged partial cross-sectional elevation view similar to FIG. 4 to show the socket and fingers in more detail.
Figure 7:
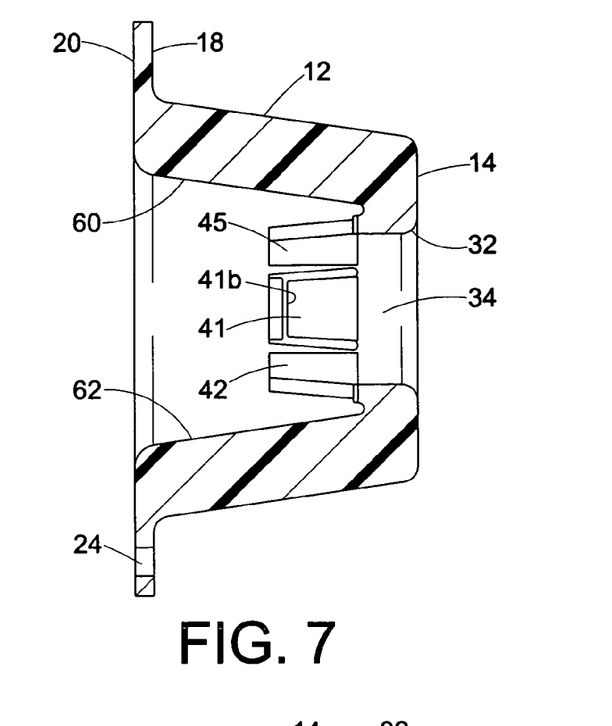
FIG. 7 is a cross-sectional elevation view taken generally on line 7-7 of FIG. 3.
Figure 8:
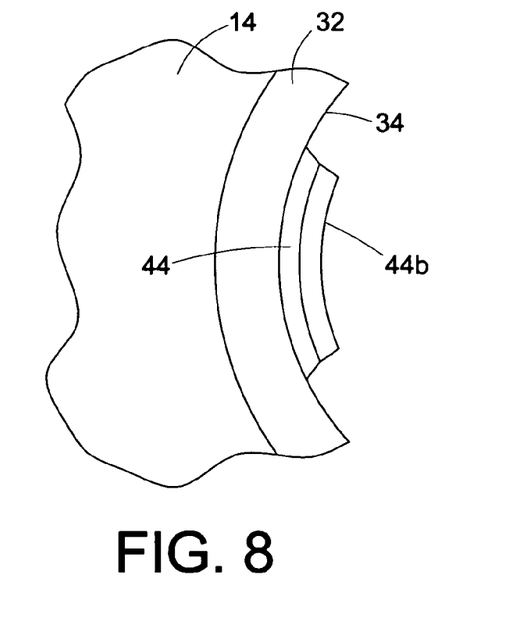
FIG. 8 is an enlarged partial top plan view similar to FIG. 3 to show in more detail a finger and finger tooth within the socket.
Figure 9:
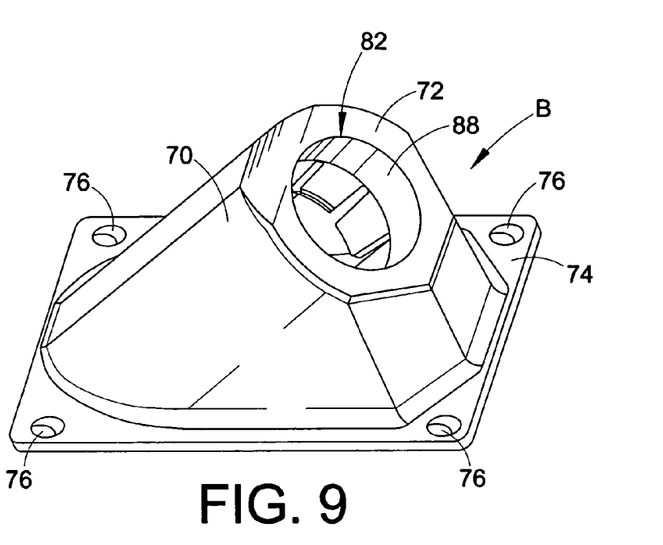
FIG. 9 is a perspective illustration of another embodiment.
Figure 10:
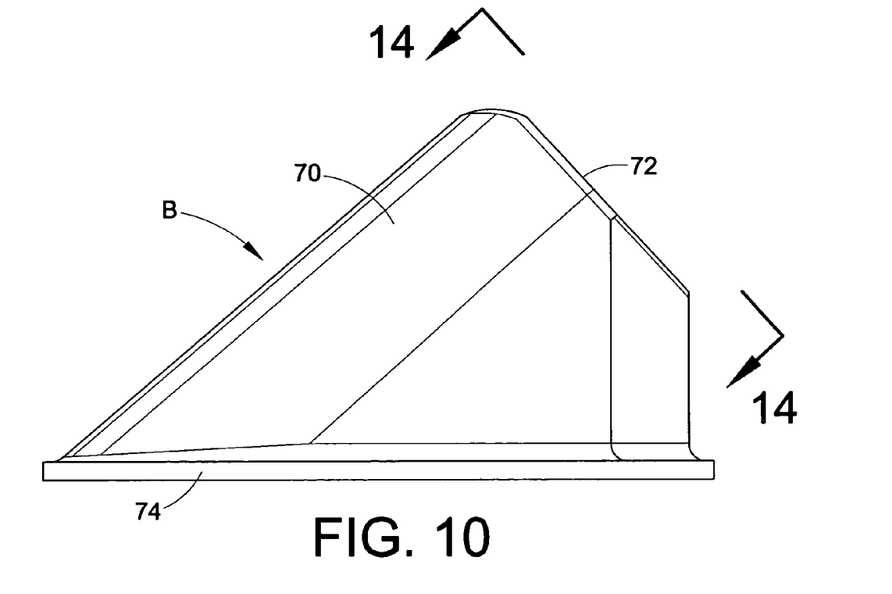
FIG. 10 is a side elevational view thereof.
Figure 11:
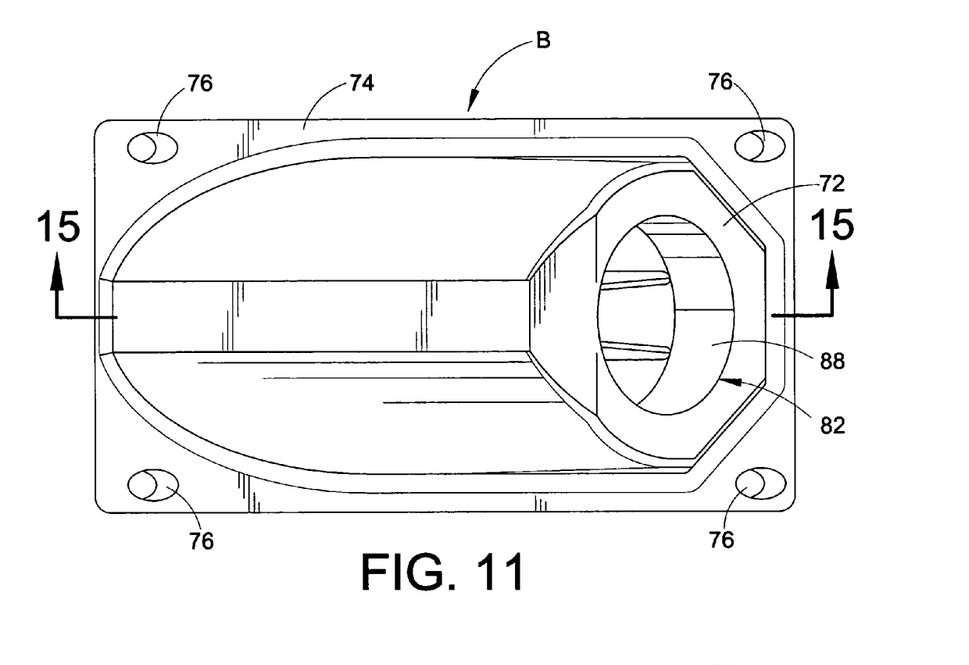
FIG. 11 is a top plan view thereof.
Figure 12:
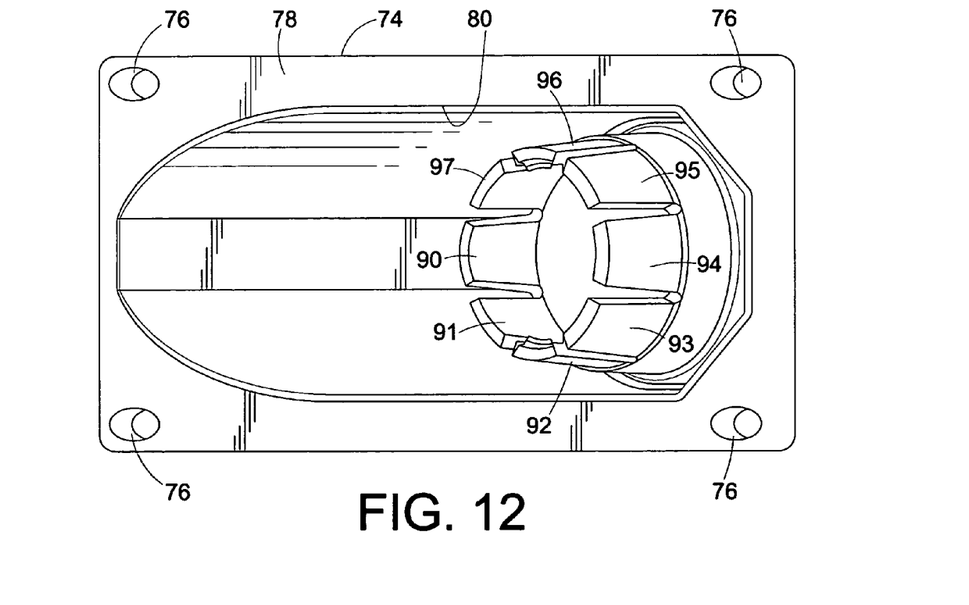
FIG. 12 is a bottom view thereof.
Figure 13:
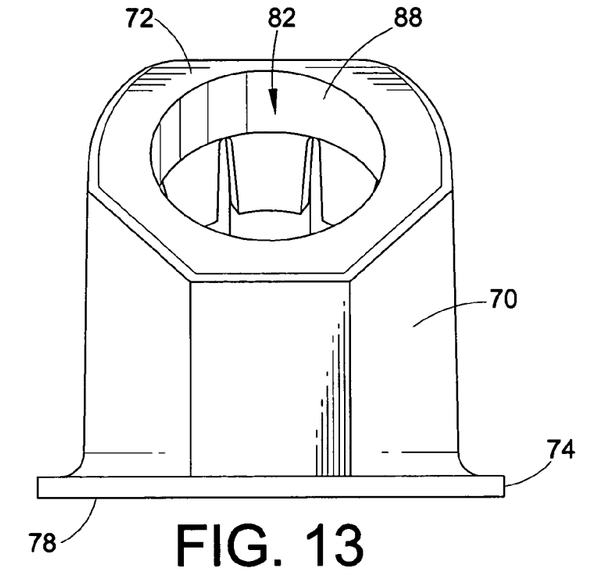
FIG. 13 is a front elevational view thereof.
Figure 14:
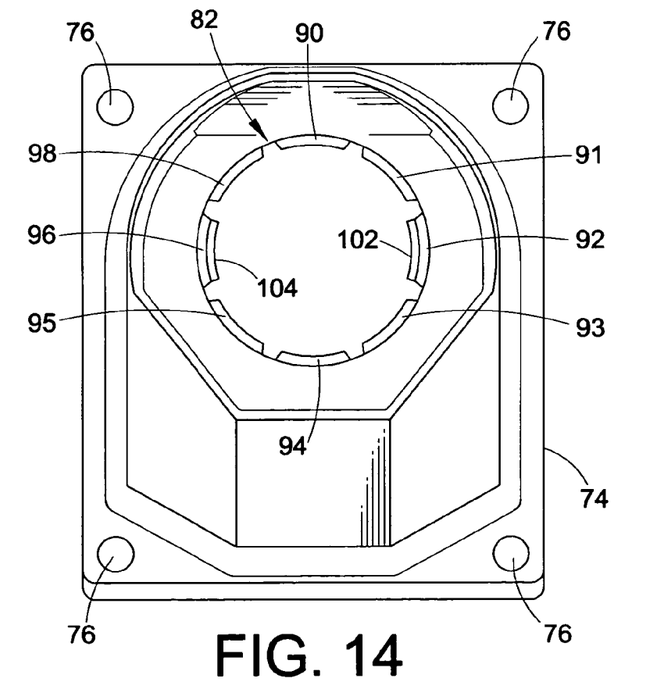
FIG. 14 is a plan view looking generally in the direction of arrows 14-14 in FIG. 10.

All of resilient fingers 40-45 also are gradually reduced in circumferential width from generally cylindrical entrance portion 34 to the terminal ends of the fingers as shown for fingers 40, 45 and terminal ends 40*a*, 45*a* thereof in FIG. 6. Thus, all of the circumferential spaces between adjacent fingers have a generally inverted V shaped configuration as shown for space 52 between fingers 40 and 45 in FIG. 6. Each of the opposite sides of a finger may slope inwardly toward one another in a direction toward the finger terminal end at an angle at around two degrees.

At least one opposite pair of fingers 41, 44 have inwardly extending teeth 41*b*, 44*b*, thereon spaced from finger terminal ends 41*a*, 44*a*. The inwardly facing end portions of teeth 41*b*, 44*b* are smoothly rounded to provide cam action when a corrugated ENT tube is inserted into or removed from socket 30. As shown is FIG. 6, teeth 41*b*, 44*b* are spaced upwardly from finger terminal ends 41*a*, 44*a*, and the finger end portions have a reduced radial thickness between the teeth and the finger terminal ends. In other words, there is a notch in the inner surface of the finger end portion below the tooth. Teeth 41*b*, 44*b* are configured so that the force required to insert an end portion of an ENT tube into the socket is around the same, or not significantly less than, the force required to remove the end portion of the ENT tube from the socket.

Opposite flat ribs 60, 62 are molded within the cavity in fitting A and extend generally radially of the socket axis. Ribs 60, 62 are integrally connected with the inside surface of end wall 14, the inner surface of peripheral wall 12 and the inner surface of cylindrical entrance portion 34. Ribs 60, 62 extend to bottom opening 16 and can be gripped within the jaws of a pliers for pulling the fitting from a concrete mass and separating the same from the end portion of an ENT tube that is received within socket 30.

Ribs 60, 62 have a generally uniform thickness throughout their extent. The ribs have sloping inner surfaces that slope at the same angle as the external surface of peripheral wall 12. The ribs are not connected with any of the resilient fingers.

FIGS. 9-18 show another embodiment wherein fitting B is molded in one-piece of plastic material with a peripheral wall 70 and a flat end wall 72. Fitting B has a generally rectangular flange 74 extending outwardly therefrom, and fastener receiving holes 76 are provided through flange 74 at the corners thereof for attaching fitting B to a flat surface of a concrete form. The bottom outer surface 78 of flange 74 is plane for positioning against a plane surface of a concrete form. Flange 74 surrounds a bottom opening 80 to an internal cavity within fitting B.

Figure 15:
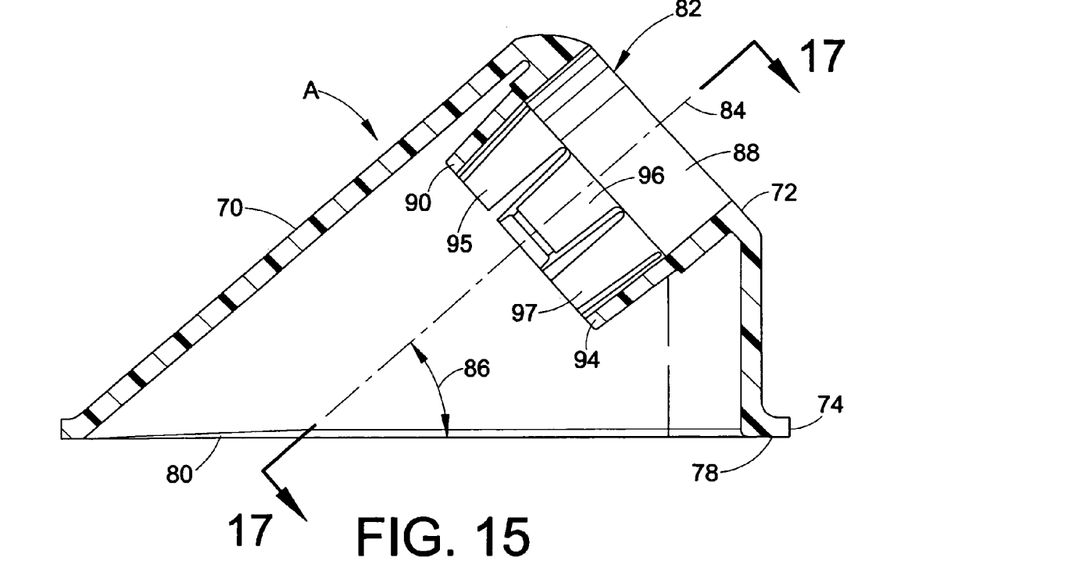
FIG. 15 is a cross-sectional elevational view taken generally on line 15-15 of FIG. 11.
Figure 16:
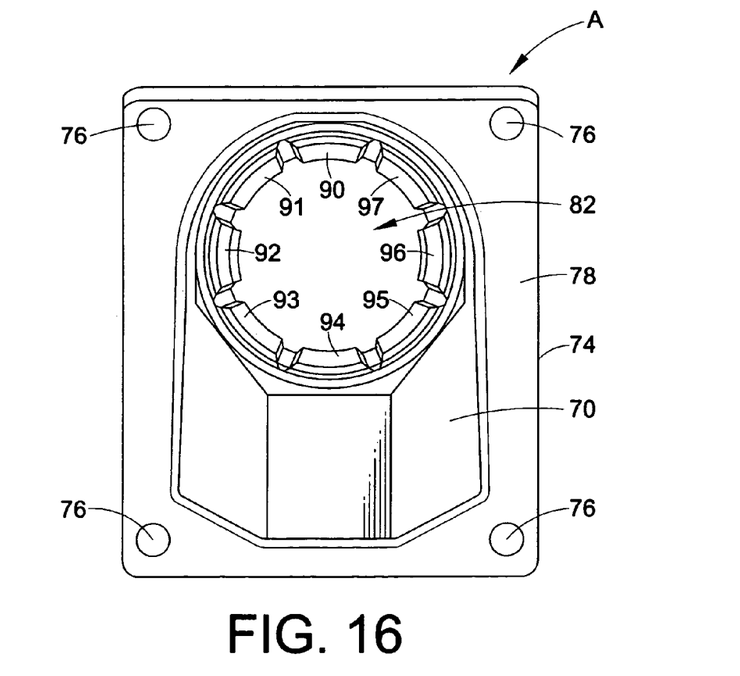
FIG. 16 is a bottom plan view of the fitting in FIG. 10 looking in a direction generally opposite to that of arrows 14-14 in FIG. 10.
Figure 17:
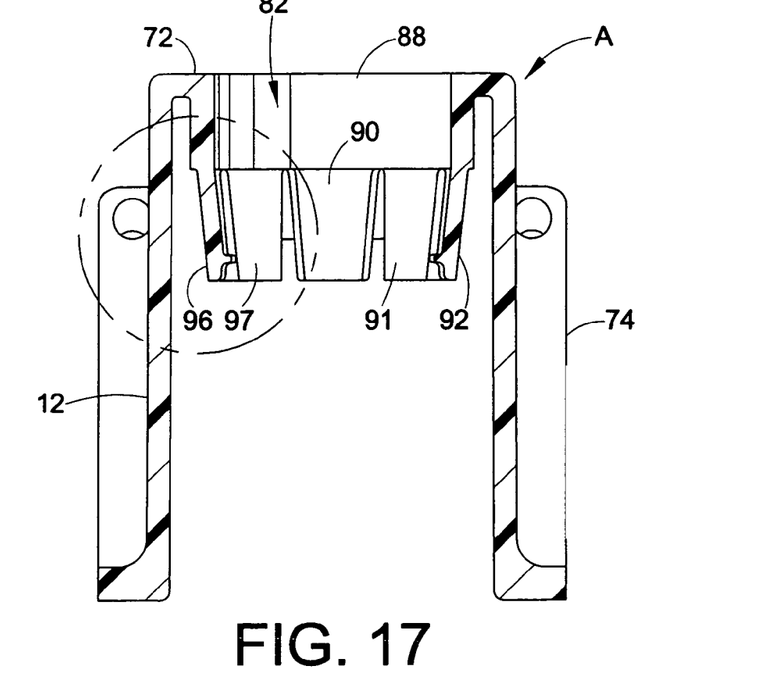
FIG. 17 is a partial cross-sectional elevational view taken generally on line 17-17 of FIG. 15.

A generally cylindrical socket 82 extends into the cavity within fitting B through flat wall 72 thereof. As shown in FIG. 15, socket longitudinal axis 84 intersects bottom opening 80. In the arrangement shown, socket axis 84 is inclined at an angle 86 of around 45 degrees to the plane of flange outer surface 78.

Socket 82 has a generally cylindrical entrance portion 88 and a plurality of circumferentially-spaced resilient fingers extend inwardly from the generally cylindrical entrance portion. In the arrangement shown, there are 8 resilient fingers, 90, 91, 92, 93, 94, 95, 96 and 97. This is the configuration normally used for attaching three quarter inch and one inch ENT tubing to the fitting. Six resilient fingers can be used on a fitting for attaching one-half inch ENT tubing thereto. However, it will be appreciated that a larger or smaller number of fingers maybe used.

The resilient fingers slope inwardly toward socket longitudinal axis 84, and the inner surfaces of the fingers lie on the surface of a common cone. The resilient fingers are gradually reduced in circumferential width along the length thereof so that their opposite sides slope toward one another in a direction toward the finger terminal ends. Thus, the space between adjacent fingers has a generally inverted V-shaped configuration.

Figure 18:
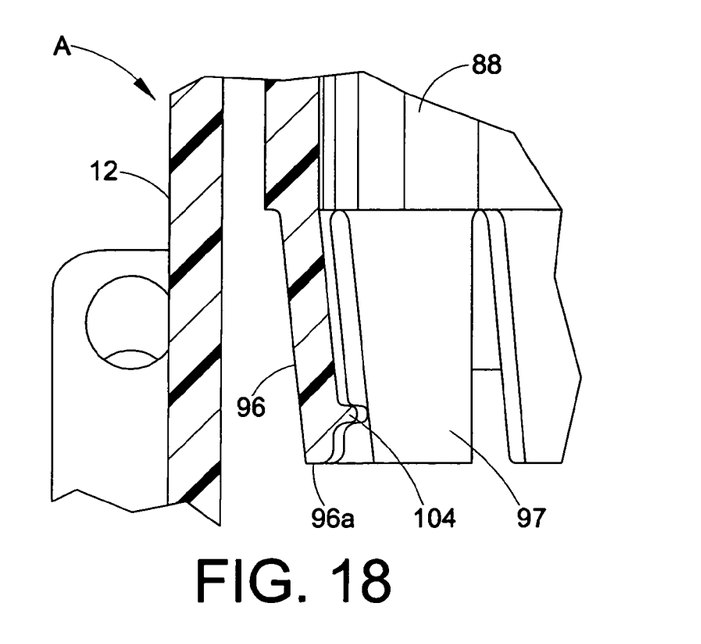
FIG. 18 is an enlarged cross-sectional elevational view of the circled area in FIG. 17.

At least one pair of opposite fingers 92, 96 have inwardly extending teeth 102, 104 thereon. The inwardly facing ends of the teeth are smoothly curved or rounded as shown in FIG. 18 to facilitate insertion and removal of an end portion of an ENT tube with respect to the socket. As shown in FIG. 18, tooth 104 is spaced above tooth terminal end 96*a*, and the terminal end portion of finger 96 is reduced in radial thickness below tooth 104.

The end portion inner surfaces of all of the resilient fingers preferably make frictional contact with the outer surface of an end portion of an ENT tube. The teeth on fingers 92, 96 are received in an annular groove in the tube for releasably retaining the tube end portion within the socket. However, it will be recognized that the fingers can be configured simply to provide a guiding function for guiding an ENT tube within the socket while the teeth on fingers 92, 96 provide the only gripping action on the tube end portion. Obviously, additional fingers could have teeth thereon, but this makes insertion and removal of a tube end portion more difficult. Therefore, it is most preferable to have the gripping teeth on only one opposite pair of resilient fingers.

Figure 19:
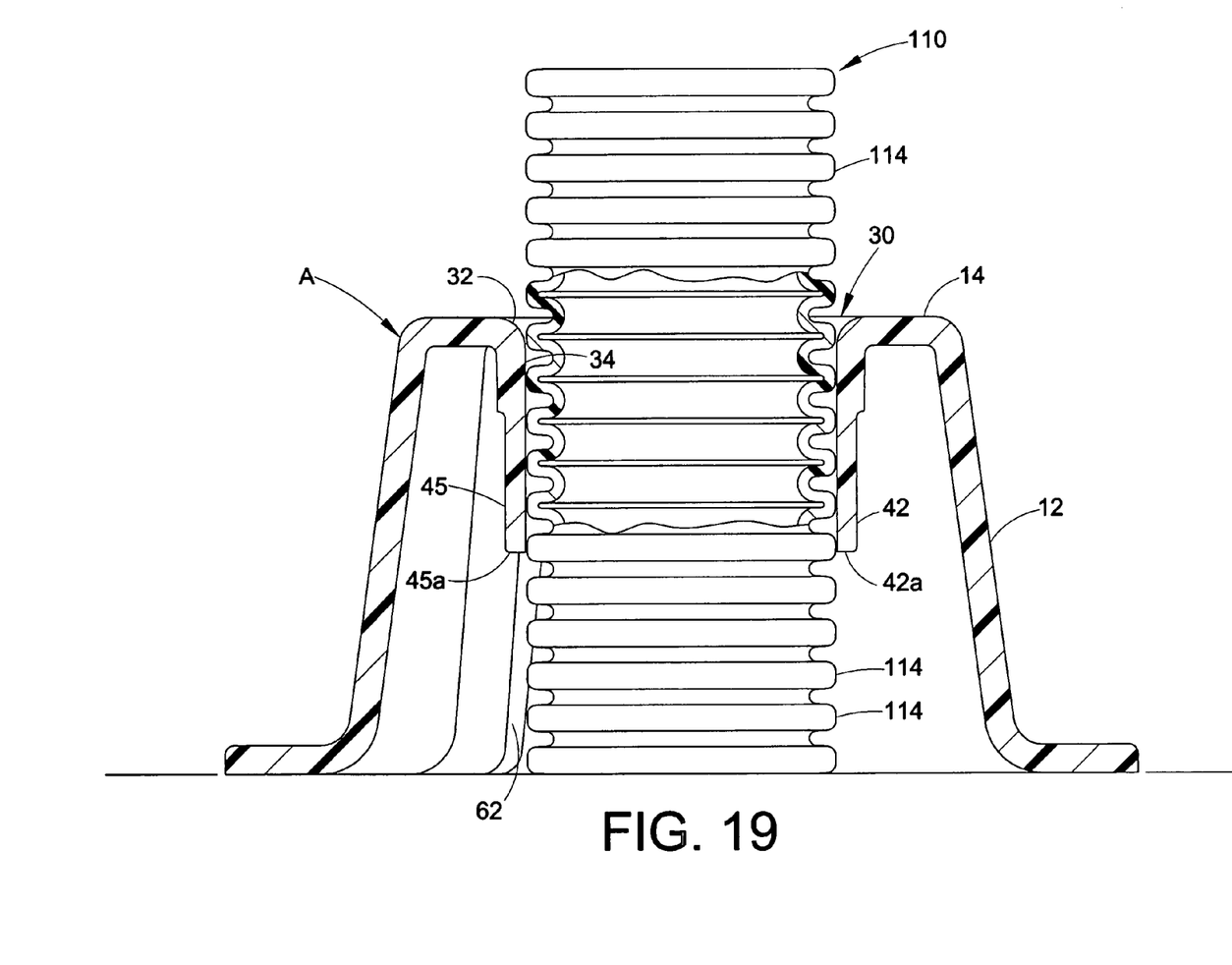
FIG. 19 is a cross-sectional elevational view taken generally on line 19-19 of FIG. 3, and with an end portion of an ENT tube received in the fitting socket.
Figure 20:
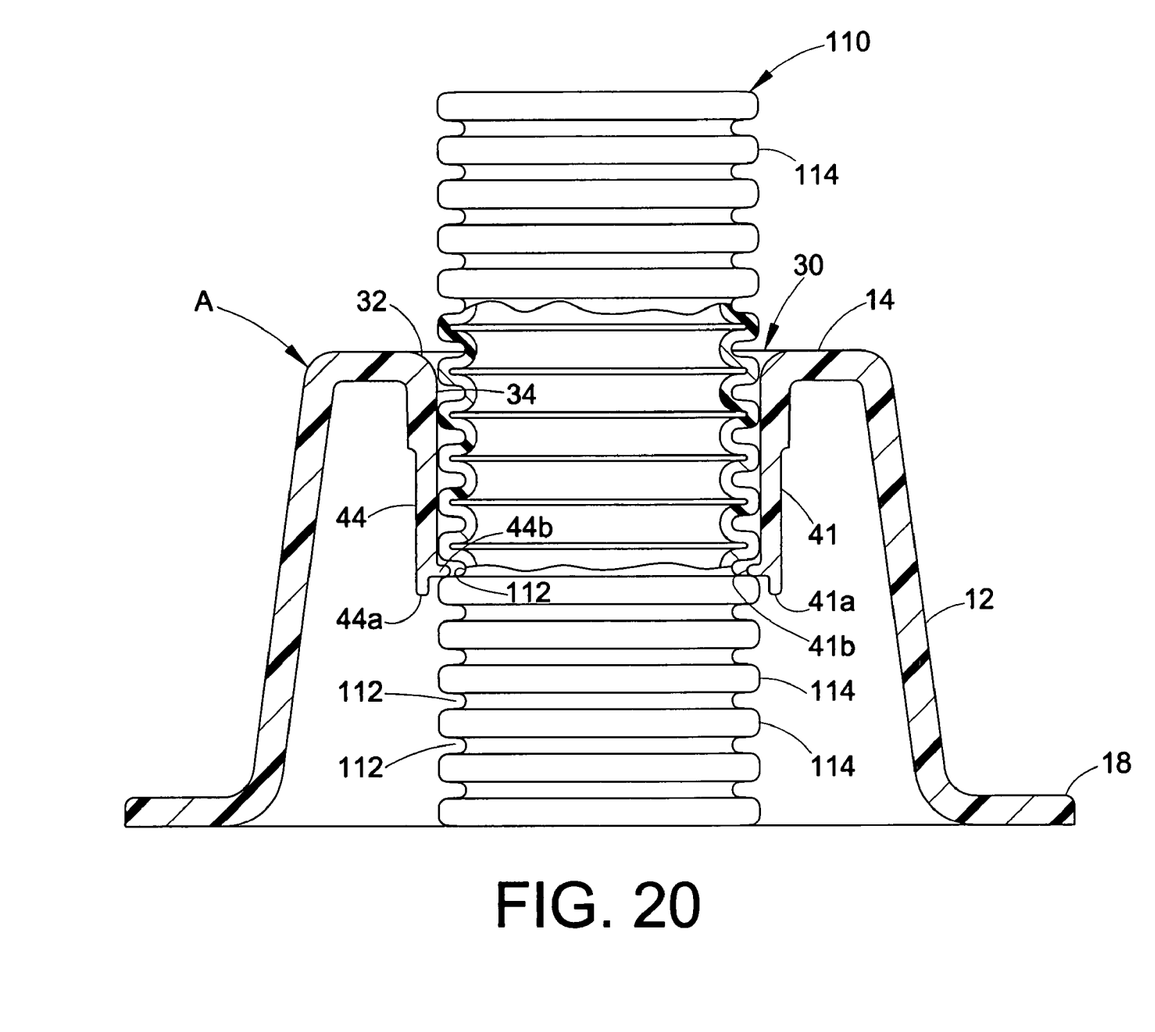
FIG. 20 is a cross-sectional elevational view similar to FIGS. 4 and 6, and with an end portion of an ENT tube received in the fitting socket.

FIGS. 19 and 20 show an end portion of a corrugated ENT tube 110 received in socket 30. Tube 110 has longitudinally-spaced annular grooves 112 alternating with annular ridges 114, and the teeth 41*b*, 44*b* on fingers 41, 44 are received in one groove to hold the tube against accidental displacement from within the socket while the concrete forms and reinforcing bars are readied for pouring concrete, and during the placement of the concrete. The reduced radial thickness of fingers 41, 44 beneath teeth 41*b*, 44*b* provides clearance for the ENT tube so that the tube does not engage the inner surfaces of the toothed fingers below the teeth. Rounding of the tooth ends provides cam action to facilitate insertion of the tube end portion into the socket and withdrawal thereof from the socket. The configuration is such that the force required to insert a tube end portion into the socket is not much different from the force required to separate the tube from the socket.

Although other configurations are possible, the socket is dimensioned and configured relative to the size of the ENT tubing so that the external surfaces of the ENT tube annular ridges 114 engage the inner surfaces of the resilient fingers so that the fingers are bent outwardly away from the socket longitudinal axis. Thus, the fingers frictionally grip the annular ridges on the ENT tubing.

Teeth 41*b*, 44*b* are relatively small and project radially inwardly from the inner surfaces of fingers 41, 44 a relatively small distance, such as around 0.05 inch. The fingers also have a relatively small thickness, such as around 0.025 to 0.030 inch in a direction parallel to the socket axis. The tooth ends then are rounded at a radius of around one tenth of an inch. Thus, the teeth project a very short distance into an annular groove 112 in the ENT tubing, and the teeth are a loose fit in the groove because the groove longitudinal width is much larger than the tooth thickness in the same direction.

Although the fitting has been shown and described with reference to representative embodiments, it is obvious that alterations and modifications will occur to others skilled in the art upon the reading and understanding of this application. Therefore, it is to be understood that the invention may be practiced otherwise than as specifically described herein while remaining within the scope of the claims.

What is claimed is:

1. A fitting for attaching electrical nonmetallic tubing to a surface comprising:
   a molded plastic body having an inverted generally cup-like configuration;
   said body having a body wall forming an internal cavity having a bottom opening;
   an attachment flange extending outwardly from said body wall around said bottom opening, said flange having a plane outer surface and having a plurality of fastener receiving holes therethrough spaced around said opening;
   a socket extending through said wall into said cavity for receiving an end portion of an electrical nonmetallic tube;
   said socket having a longitudinal socket axis intersecting said bottom opening;
   said socket having a generally cylindrical entrance portion extending over a portion of the axial length of said socket;
   said socket having a plurality of circumferentially-spaced resilient fingers extending from said generally cylindrical entrance portion over the remaining length of said socket;
   said fingers being inclined inwardly toward said socket axis and having finger inner surfaces that lie on the surface of a cone;
   said body wall having a wall internal surface defining said cavity;
   at least one flat rib extending along said wall internal surface; and
   said rib being graspable between pliers jaws at said bottom opening.

2. The fitting of claim 1 wherein said rib is connected within said cavity to said generally cylindrical entrance portion of said socket.

3. A fitting for attaching electrical nonmetallic tubing to a surface comprising:
   a molded plastic body having an inverted generally cup-like configuration;
   said body having a generally frustoconical peripheral wall terminating in an endwall and forming an internal cavity having a generally circular bottom opening;
   an attachment flange extending outwardly from said body wall around said bottom opening, said flange having a plane outer surface and having a plurality of fastener receiving holes therethrough spaced around said opening;
   a socket extending through said endwall into said cavity for receiving an end portion of an electrical nonmetallic tube;
   said socket and said bottom opening having coincidental axes;
   said socket having a generally cylindrical entrance portion extending over a portion of the axial length of said socket;
   said socket having a plurality of circumferentially-spaced resilient fingers extending from said generally cylindrical entrance portion over the remaining length of said socket;
   said fingers being inclined inwardly toward said socket axis and having finger inner surfaces that lie on the surface of a cone;
   said body wall having a wall internal surface defining said cavity;
   at least one flat rib extending along said wall internal surface; and
   said rib being graspable between pliers jaws at said bottom opening.

4. The fitting of claim 3 wherein said rib is connected within said cavity to said generally cylindrical entrance portion of said socket.

5. A one-piece fitting for attaching an electrical nonmetallic tube to a plane support surface of a concrete form, comprising;
   a molded plastic body having an inverted generally cup-like configuration;
   said body having a peripheral wall and an endwall forming an internal cavity with a bottom opening;
   an attachment flange extending outwardly from said peripheral wall around said bottom opening, said flange having a plane outer surface and having a plurality of fastener receiving holes therethrough spaced around said opening;
   said plane outer surface of said attachment flange being at one terminal end of said fitting and said end wall being at a generally opposite terminal end of said fitting;
   said plane outer surface of said attachment flange being positionable against the plane support surface for attaching the fitting to the support surface with the bottom opening closed by the support surface;
   a generally cylindrical socket extending through said endwall into said cavity for receiving an end portion of the electrical nonmetallic tube;
   said socket having a socket wall that is surrounded by said cavity and with said peripheral wall in outwardly-spaced surrounding relationship to said socket wall;
   said socket having a longitudinal socket axis intersecting said bottom opening;
   said socket wall having a generally cylindrical entrance portion extending over a portion of the axial length of said socket;
   said socket wall having a plurality of circumferentially-spaced resilient fingers extending from said generally cylindrical entrance portion over the remaining length of said socket wall and being inclined inwardly toward said socket axis from said generally cylindrical entrance portion;
   said fingers having finger terminal ends spaced from said bottom opening;
   said cavity, said socket and said peripheral wall being configured to provide insertion of the end portion of the electrical nonmetallic tube into and through said socket past said finger terminal ends into engagement with the support surface that closes said bottom opening when said plane outer surface of said attachment flange rests against the support surface;
   said body peripheral wall and endwall being continuous and free of openings therethrough around said socket to preclude entry of poured concrete into said socket and said cavity through said body peripheral wall and endwall; and,
   said fingers being configured to releasably hold an end portion of the electrical nonmetallic tube in said socket against unintentional displacement therefrom while permitting separation of the socket and the end portion of the electric nonmetallic tube;

wherein said socket axis extends at an angle of 45° to the plane of said flange plane outer surface.

6. A fitting for attaching electrical nonmetallic tubing to a surface comprising:

a molded plastic body having an inverted generally cup-like configuration;

said body having a body wall forming an internal cavity with a bottom opening;

an attachment flange extending outwardly from said body wall around said bottom opening, said flange having a plane outer surface that defines a terminal end of said fitting;

a socket extending through said body wall into said cavity for receiving an end portion of an electrical nonmetallic tube;

said plane outer surface of said attachment flange being securable against a support surface with said socket opening outwardly away from the support surface for receiving an end portion of an electrical nonmetallic tube and with the bottom opening being closed by the support surface;

said socket having a longitudinal socket axis intersecting said bottom opening;

said socket having a plurality of circumferentially-spaced resilient fingers extending into said cavity and having finger terminal ends spaced from said bottom opening;

said body wall being continuous and free of openings therethrough around said socket, including around said socket fingers, to preclude entry of poured concrete into said socket and said cavity through said body wall;

said cavity, said body wall and said socket being configured to provide insertion of an electrical nonmetallic tube into and through said socket past said finger terminal ends into engagement with a support surface that overlies said bottom opening when said plane outer surface of said flange is positioned against the support surface for supporting the fitting thereon; and, said fingers being configured to releasably hold an end portion of an electrical nonmetallic tube in said socket against unintentional displacement therefrom while permitting separation of the socket and the end portion of the electrical nonmetallic tube;

wherein said body wall is configured within said cavity with at least one gripable projection that is accessible through said bottom opening and is gripable in pliers jaws for separating the fitting from a concrete mass.

* * * * *